United States Patent [19]

Boundy

[11] Patent Number: 5,082,022
[45] Date of Patent: Jan. 21, 1992

[54] MULTIPLE OUTLET WATER TIMER
[75] Inventor: Jeffrey W. Boundy, Albert Park, Australia
[73] Assignee: Sabco Limited, Australia
[21] Appl. No.: 586,427
[22] Filed: Sep. 21, 1990

[30] Foreign Application Priority Data

Sep. 28, 1989 [AU] Australia .................... PJ6632

[51] Int. Cl.⁵ .................................... F16K 11/10
[52] U.S. Cl. .................. 137/624.12; 137/624.2; 137/627
[58] Field of Search ............ 137/624.17, 624.2, 627, 137/624.12, 624.18

[56] References Cited

U.S. PATENT DOCUMENTS

| | | | |
|---|---|---|---|
| 2,074,437 | 3/1937 | Snyder | 137/624.17 X |
| 2,837,118 | 6/1958 | Allen | 137/624.17 X |
| 3,735,779 | 5/1973 | Hunter | 137/624.2 |
| 4,235,254 | 11/1980 | Kirby | . |
| 4,310,021 | 1/1982 | Hauser | 137/627 X |
| 4,313,455 | 2/1982 | Pitman | 137/627 X |
| 4,351,360 | 9/1982 | Smyth | 137/624.12 |
| 4,526,198 | 7/1985 | Scott | . |
| 4,562,865 | 1/1986 | Lemkin | 137/624.12 |
| 4,708,162 | 11/1987 | Bayat | . |
| 4,791,948 | 12/1988 | Bayat | . |

FOREIGN PATENT DOCUMENTS 537721 12/1984 Australia .

Primary Examiner—Alan Cohan
Attorney, Agent, or Firm—Oldham & Oldham Co.

[57] ABSTRACT

A multiple outlet water timer having an inlet and a plurality of outlets each having its respective control valve. The timer is operated by a clockwork mechanism with a cam on the clockwork mechanism case, a cam follower for each valve and each cam follower is individually adjustable so that the flow of water through each outlet is adjustable independently of the other outlets.

3 Claims, 2 Drawing Sheets

MULTIPLE OUTLET WATER TIMER

This invention relates to a multiple outlet water timer, more particularly to a water timer for the watering or irrigation of gardens, lawn plot, or other tracts of garden or land or the like, particularly where each or the various areas may have to be watered for a different length of time.

BRIEF DESCRIPTION OF THE PRIOR ART

In our earlier patent specification No. AU537721 there is described a water timer which regulates the flow of water therethrough to a single outlet so that for the watering of another area for a different length of time the timer has to be reset and the hose and sprinkler or other watering outlet has to be moved to the new area.

U.S. Pat. No. 4,235,254 describes a flow operated valve having a single inlet and multiple outlets. The flow of water is directed to a single outlet in sequence. The flow of water to the selected outlet is controlled by a hinged valve which is operated by a control which is rendered operative by the initiation and cessation of the water flow at the inlet. Thus this unit requires some means of turning off and on the water at the inlet, and this can be manually done or would require some form of other control mechanism.

U.S. Pat. No. 4,526,198 describes an irrigation controller for controlling a plurality of valves either hydraulically or electrically and is designed for either six or seven day operation.

U.S. Pat. Nos. 4,708,162 and 4,791,948 describe a water control system operated by a clock timer in which the system has a master control valve to control the flow to a manifold, the outlets from the manifold being controlled by control valves operated in a predetermined sequence by the clockwork timer. The master valve opens only when one of the control valves is opened.

Also there are available complex computer controlled watering and irrigation systems, but these are relatively expensive to purchase and install and these also require a permanent electrical power supply.

BRIEF DESCRIPTION OF THE INVENTION

It is an object of this invention to provide a simple timing unit which will deliver water to different area each of which may require a different watering time.

It is a further object of this invention to provide a multiple outlet watering timer having a plurality of outlets the flow of water through each of which can be individually controlled.

Thus there is provided according to the invention a multiple outlet water timer tap having an inlet and a plurality of outlets, each of the outlets being controlled by its own respective valve, a clockwork timer mechanism, and cam means operatively connected between the clockwork timer and each of the valves, said cam means being individually adjustable so that the flow of water through each outlet is individually controlled.

In a preferred form of the invention the cam means can comprise a cam which is driven by the clockwork mechanism, and each valve is operated by its own cam follower which is adjustable in position to vary the length of watering time for that valve, the valves and cam followers being circumferentially arranged around the drive shaft of the clockwork timer.

BRIEF DESCRIPTION OF THE DRAWINGS

In order to more fully describe the invention reference will now be made to the accompanying drawings in which:

FIG. 3 shows an exploded view of the component parts of the invention.

DESCRIPTION OF THE PREFERRED EMBODIMENT

Figure 1:
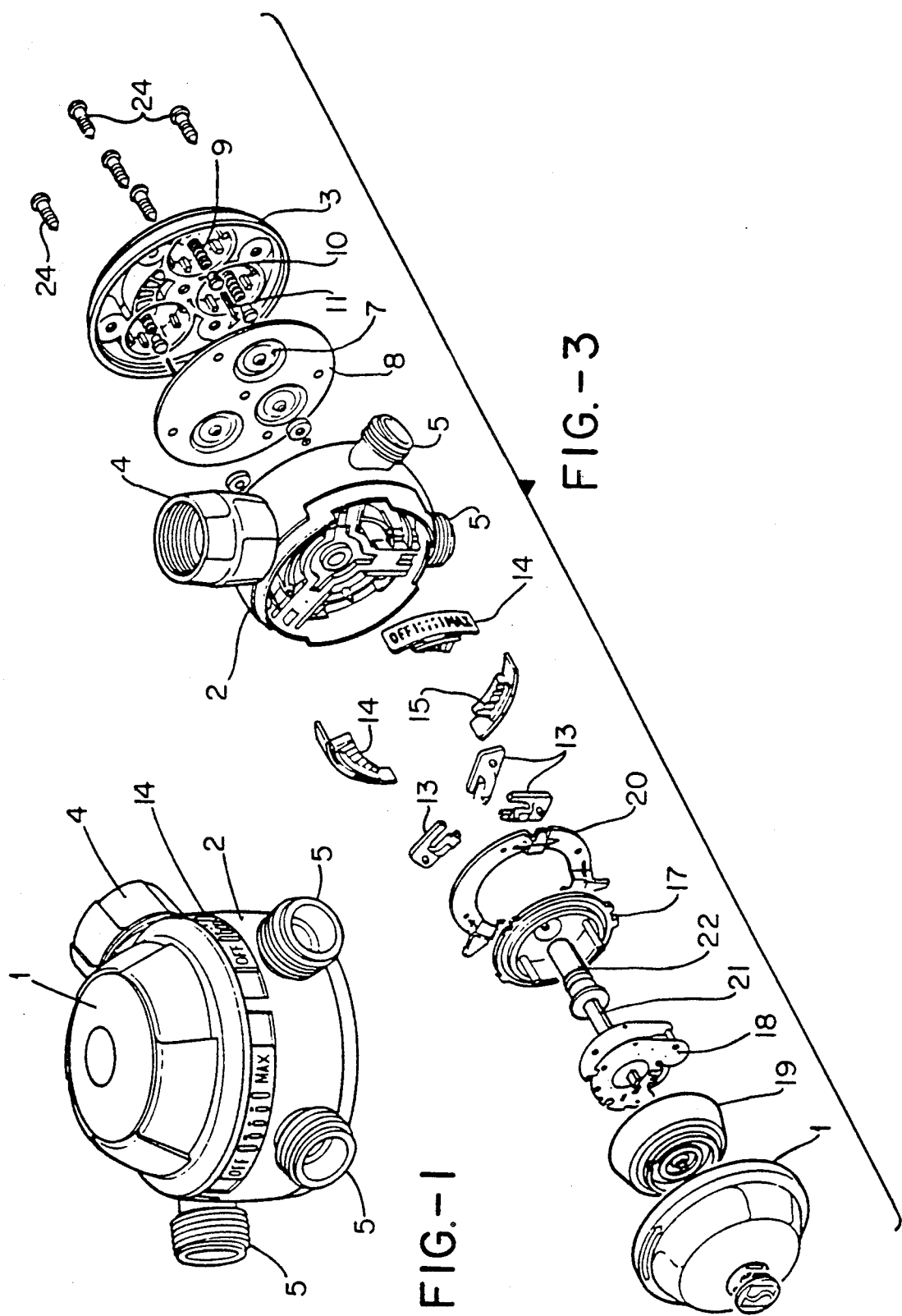
FIG. 1 is a perspective view of the invention.
Figure 2:
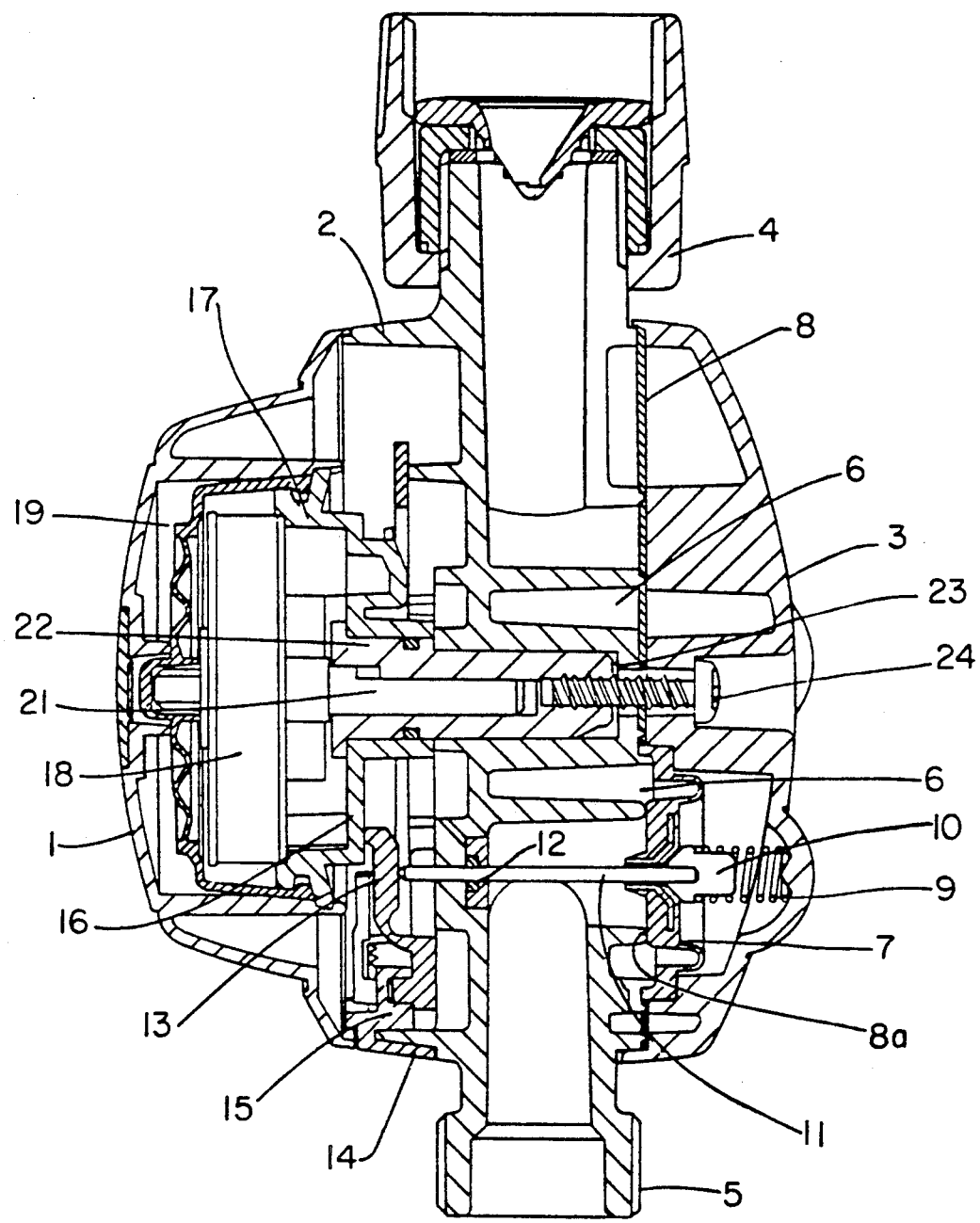
FIG. 2 is a cross-section of the invention.

Referring to the drawings the multiple outlet water timer has a clock cover 1, a body 2, and a rear cover 3, the body having an inlet fitting 4 and a plurality of outlets 5 in this instance three in number. The inlet 4 connects to a circumferential chamber 6. The flow from the circumferential chamber 6 to the outlets 5 is controlled by the respective valves 7 mounted between the body 2 and the rear cover 4, a diaphragm gasket 8 providing the seal between the body 2 and the rear cover 3.

Each of the valves 7 is a diaphragm valve and is held closed against its seat 8a by a spring 9 acting on the head 10 of the push rod 11 which passes through the valve 7 and a hole 12 in the body 2 to engage its respective cam follower 13. Each cam follower 13 engages a slider 14 which is a timer adjuster and has a portion 15 which increases radially with respect to the axis of the body so that as the slider 14 is moved circumferentially around the body the cam follower is either moved radially inwardly or outwardly. When the push rod is engaged by the cam, the push rod compresses the spring 9 so that the valve is then opened by inlet water pressure. The push rod holds the spring compressed for the duration of the watering time.

Thus each cam follower as it moves toward the central axis of the timer increases the watering time and as it moves toward the outer periphery of the body the watering time is decreased.

Each of the cam followers rides on a cam 16 formed on the clock base 17, the clockwork mechanism 18 being sealed by a clock seal 19 in the clock cover 1. As only one cam has been formed on the clock base, the cam gives the same degree of lift for the valve opening of each valve. The cam follower is retained in its set position by means of a ratchet plate 20 which is flexible enough to allow the user to reset the time by means of the slider 14.

The clockwork mechanism 18 has a shaft 21 which engages non-rotatably in a shaft sleeve 22 which in turn fixedly engages in a hole 23 in the body 2 and is retained in position by a screw 24 holding the rear cover 3 in position.

The inlet is provided with the usual fitting for connection to the tap and the outlets the usual fittings for connection to the respective hoses.

With the present invention each of the outlets can be set to deliver water from 0 to 40 minutes in 10 minute increments, and it will be seen that as the clockwork drives the cam that water will flow from one outlet for its set time and when this watering has been completed the cam will continue to move and after 40 minutes from the engagement with the previous valve will engage the cam follower of the next valve so that this is then held open for the required set time. Thus each watering position can be present to it's desired watering time and the three positions will be watered in sequence. Thus, if the time of watering is less than 40 minutes, there will be a period of time totalling 40 minutes before the next valve is engaged.

While the invention has been described with reference to a timer having three outlets it will be realised that three outlets are a convenient number for a certain sized unit, and that the invention is not to be limited to such a number. For example the unit need only have two outlets or can have four or more. It will be realised that if a greater number of outlets are desired then the clockwork mechanism would preferably be one having a greater length of time such as three or four hours, so that the time for each watering position can be of the desired time. It is noted that the maximum watering time for each outlet can only be the maximum length of time of the clockwork mechanism divided by the number of outlets.

Thus it will be seen that there is provided according to the invention a multiple outlet water timer in which the times of each of the outlets can be independently set and that the outlets are operated in sequence. The timer according to the invention is a simple unit requiring only that the time for each outlet is set, and then the clockwork mechanism is wound up by turning the clock cover which in turn rotates the clockwork mechanism to wind the spring.

Although one form of the invention has been described in some detail the invention is not to be limited thereto, but can include improvements and modifications falling within the spirit and scope of the invention.

The claims defining the invention are as follows:

1. A multiple outlet water timer having a circumferential body, an inlet to the body and a plurality of outlets circumferentially arranged around the body, the flow to each of the outlets being controlled by its own respective valve, a case containing a clockwork timer mechanism having a shaft non-rotatably mounted in the body the clockwork timer being drivingly connected to said case which thus rotates about the said shaft, said case having a circumferential wall and a base, a cam on the base of the case co-operating with a cam follower for each respective valve, characterized in that each cam follower is adjustable radially of the clockwork mechanism case so that the duration of opening of its associated valve is individually adjustable, the valves being opened in sequence as the cam on the case of the clockwork mechanism actuates the valves.

2. A multiple outlet water timer as defined in claim 1 wherein the inlet opens to a circumferential chamber, each valve controlling the flow from the circumferential chamber, each valve has associated therewith a push rod which is adapted to be actuated by said cam follower, and each valve is opened by water pressure after the push rod is actuated by the cam follower.

3. A multiple outlet water timer as defined in claim 1 characterized in that each cam follower is adjusted by a slider slidable circumferentially on the surface of the body of the water timer.

* * * * *